UNITED STATES PATENT OFFICE 1,935,178

METHOD OF MAKING GELS

Gerald C. Connolly, Baltimore, Md., assignor to The Silica Gel Corporation, Baltimore, Md., a corporation of Maryland No Drawing. Application July 1, 1931, Serial No. 548,261, and in France April 9, 1931

11 Claims. (Cl. 252—2)

The present invention relates to highly porous hard gels and methods of producing the same.

It is the principal object of the invention to provide a process for making a gel having a low density and which will not substantially increase even after repeated activations at high temperatures.

The method of making such a low density gel according to this invention consists in preparing a washed hydrous gel in any suitable manner, impregnating it with a substance soluble in a leaching liquid chemically inert with respect to the gel, converting the hydrous gell into a dried gel, and leaching out the substance. The term "hydrous gel" as used herein is intended to include both hydrogels and/or gelatinous precipitates or mixtures of the two while the term "dried gel" is intended to include the dried product obtained from hydrogels and/or gelatinous precipitates or mixtures of the two.

In preparing hydrous oxide gels, the ingredients capable of forming upon reaction the desired hydrous gels are mixed together. By selecting the ingredients in the proper proportions and concentrations, and effecting the mixing under the proper conditions, a liquid reaction product results termed a "sol" which upon standing coagulates as a whole to a jelly or hydrogel or forms a gelatinous precipitate. If the ingredients are employed in the proper proportions and concentrations but the mixing is effected improperly, or if improper proportions and concentrations are used and the mixing is effected under proper conditions, the reaction product may consist either of a gelatinous precipitate exclusively, or a gelatinous precipitate associated or admixed with a sol which upon standing coagulates as a whole to a jelly or hydrogel. When three or more ingredients are used, the reaction product may consist of a gelatinous precipitate associated with a sol which after a time coagulates as a whole to a jelly or hydrogel even if the proper proportions and concentrations are employed, and the ingredients are mixed under proper conditions.

The hydrous gels employed may be either that of an oxide of iron, chromium, bismuth, aluminum, gallium, indium, copper, nickel, beryllium, titanium, zirconium, thorium, cerium, scandium, vanadium, manganese, silicon, germanium, tin, tantalium, molybdenum, tungsten, and the like, mixtures of such oxides, or salts of said metals.

The hydrous oxide gels of iron, chromium, aluminum, gallium, indium, copper, nickel, beryllium, titanium, zirconium, thorium, cerium, scandium, manganese, and vanadium tetraoxide ($V_2O_4$) may be prepared by treating a solution of a soluble salt of one of the aforesaid metals with a solution of an alkaline substance as, for example, an alkali such as sodium, potassium, or ammonium hydroxide or an alkaline salt such as sodium carbonate, potassium carbonate, lithium carbonate, sodium carbamate, sesquicarbonates, etc., of such concentration and amount that after its mixture with said solution the resulting mass is faintly or even fairly alkaline. The concentration and amount of the solution of the alkaline substance employed should be such as to be about 0.01% to 0.1%, preferably 0.02% to 0.05%, by weight in excess of that required to completely neutralize the solution of the soluble metal salt. The ingredients are mixed with thorough stirring in order to prevent local heating and also to disseminate the alkaline substance immediately throughout the mixture to prevent excessive alkalinity in spots, and the mixing should be effected at as low a temperature as is feasible. Preferably, the temperature during the mixing should not exceed about 10° C. There is formed a gelatinous precipitate or a sol capable of forming a hydrogel.

If desired, the hydrous oxide gels of iron, chromium, aluminum, gallium, indium, zirconium, manganese, etc., may be prepared by treating a solution of a soluble salt of one of the aforementioned metals with an alkaline substance in such proportions and concentrations as to form a reaction mass which is alkaline, thereby forming a gelatinous precipitate, and then treating the precipitate with a peptizing agent to peptize it. This results in the formation of a peptized mass which in final form has superior adsorptive properties than the final product obtained from a non-peptized gelatinous precipitate.

The hydrous oxide gels of either silicon, titanium, germanium, tin, tantalium, molybdenum, tungsten, and vanadium pentoxide ($V_2O_5$) may be prepared by reacting a solution of a soluble salt of one of the aforesaid metals on non-metals with a solution of an acidic substance as for example, an acid such as hydrochloric, sulphuric, nitric, or an acid salt of another of said metals or non-metals, in such proportions and concentrations as to produce a reaction mass which is slightly acid. The proportions and concentrations of the reacting ingredients should be such that the acidity of the mass ranges from 0.05 N. to 0.9 N. acid, preferably from 0.05 N. to 0.5 N. The ingredients are thoroughly agitated during the mixing. A gelatinous precipitate or a sol forms which coagulates as a whole after a time to a jelly or hydrogel.

The density of the final product may be controlled by the amount of the substance soluble in a leaching liquid chemically inert with respect to the gel used to impregnate the hydrous gel and also by the temperature of the water employed to wash the hydrous gel, or by both of these factors.

Methods of producing low density gels are known, but the products will not withstand high temperature activation without a material increase in the apparent density. For example, a silica gel that has an apparent density of 0.55 after activation at 1000° F. will have an apparent density of about 0.75 after activation at 1600° F.

In some processes employing silica gel, it is necessary to activate at relatively high temperatures, for instance, where silica gel is employed for refining lubricating oils, it is very advantageous, for economical reasons, to be able to activate at high temperatures, in order to remove the last traces of heavy carbonaceous material from the gel. The silica gel employed in refining lubricating oils for example, preferably should never have an apparent density exceeding 0.60. Heretofore, a gel of this density, used in refining oils, after a few activations at the necessarily high temperature, would have its apparent density increased to something over the desirable figure. Of course, the density can be kept constant by resorting to the use of naphthas, instead of heat, for extracting the residual oil from the spent gel, but this is not desirable. Prior gels that can be kept under 0.60 apparent density after repeated activations, have too poor a physical structure to withstand the hard usage occurring in plant operation.

According to the present invention, it is possible to produce a silica gel having an apparent density of less than 0.60 and which is substantially heat stable, that is to say, the apparent density is not materially increased by repeated activations at high temperatures.

In one method of making the dried silica gel of this invention, a washed hydrogel or jelly is prepared. This may be done in any suitable manner, for instance, according to the Patrick Patent 1,297,724, by adding, with agitation, a solution of sodium silicate to an equal volume of an acid solution, such as a 10% solution by weight of hydrochloric acid, the specific gravity of the silicate solution being about 1.185. The ratio of $SiO_2$ to $Na_2O$ in the silicate solution may be as in any commercial solution, about 3.25 to 1. This reaction mixture, or sol, is allowed to set to a hydrogel or jelly which is washed with water to remove the salt and acid. The temperature of the water may range from 105° F. to 175° F., for instance, 105° F., 125° F., 140° F., 150° F., 165° F., or 175° F., but preferably 150° F.

The hydrogel is then impregnated with a substance which is soluble in a leaching liquid chemically inert with respect to the gel. For this purpose the hydrogel is treated with a solution of a metal salt soluble in a leaching liquid such as either water or acid. The soluble metal salts may be ferric nitrate, ferric chloride, copper sulphate, aluminum chloride, titanium chloride, sodium sulphate, sodium chloride, potassium sulphate, potassium chloride, calcium chloride, or magnesium chloride. It is preferred to use as the impregnating agent a salt of an alkaline earth metal such as calcium chloride which is soluble in a leaching liquid such as water but it is to be understood that any of the other named metal salts may be employed.

The amount of the metal salt present in the hydrogel after impregnation determines the apparent density of the final product. If the hydrogel is charged with a large amount of metal salt, the apparent density of the final product will be low. On the other hand, if the hydrogel is charged with a lesser amount of metal salt, the final product will have a slightly higher apparent density. Thus, by varying the amount of metal salt with which the hydrogel is charged it is possible to increase or lower the apparent density of the final product.

Another factor which affects the apparent density of the final product is the temperature of the water employed in washing the hydrogel prior to impregnation. A hydrogel washed with water at 150° F. charged with a large amount of the metal salt gives a final product having a fixed low apparent density. A hydrogel washed with water at 105° F. charged with the same amount of the metal salt, gives a final product having a slightly higher apparent density. By impregnating the 105° F. washed hydrogel with a greater amount of the metal salt than that used for impregnating the 150° F. washed hydrogel it is possible to obtain final products having the same apparent densities.

When using calcium chloride the washed hydrogel or jelly is soaked in a 15% solution of the said salt for about 5 hours and then drained and dried. The drying step converts the calcium chloride impregnated hydrogel, the major portion of which is water, into the nearly dehydrated vitreous porous gel. The drying may be effected in any suitable manner, as by passing a current of air at 75° to 120° C. over the hydrogel, and later subjecting the partially dried gel to a higher temperature, for instance 300° to 400° C. The dried gel contains as much as 30% calcium chloride by weight of the dry impregnated gel.

The dried gel is next caused to adsorb a certain percentage of water vapor so as to avoid decrepitation or shattering of the gel granules in the leaching step which follows. This may be done by introducing a small amount of water vapor in the form of steam into a stream of air and then passing the air mixture over the gel. If desired, the gel particles may be arranged in a thin layer, and then exposed to the atmosphere of the room in which steam may or may not be introduced. Due to the presence of the calcium chloride in the gel, the gel readily adsorbs sufficient moisture.

After the gel has become 30% or more saturated with water vapor, it is leached with water, preferably hot water at about 180° F., and the leaching continued until substantially all of the calcium chloride has been removed or until the leaching water shows only a trace when tested with a solution of silver nitrate. Most of the calcium chloride leaches out rather readily and the resulting solution can be used again for impregnating more hydrogel.

The strength of the calcium chloride or other impregnating solution may be varied according to convenience, and the temperature at which the soluble material is leached out likewise may be varied according to convenience or necessity.

The leached gel is now heated to dry or activate it, as by passing a current of air at 600° F. over the gel for 3 hours.

If a granular product is not required, the step of permitting the dried gel to adsorb water vapor may be omitted. This step is taken to prevent decrepitation when washing the salt out of the gel, in order to obtain the final product in granular form.

To give some idea of the heat stability of a silica gel made according to the present invention, one gel after activation for 3 hours at 1000° F. had an apparent density of 0.561. The same gel after activation for 3 hours at 1600° F. had an apparent density of 0.591. The corresponding apparent densities of a prior low density gel were 0.55 and 0.75 respectively.

Repeated heatings to 1000° F. or lower temperatures will not materially increase the apparent density value of 0.561. Likewise, repeated heatings to 1600° F., or lower temperatures, will not materially affect the apparent density value 0.591.

For the making of a dried alumina gel according to the present invention, a hydrous gel is prepared by mixing together equal volumes of a solution of aluminum sulphate of about 5% to 10% strength by weight and 1 N. alkali solution, such as sodium or ammonium hydroxide, at a low temperature, preferably 0° C. or lower, as minus 5° C. The aluminum sulphate solution may be added to the alkali solution or vice versa, or the two solutions may be flowed together simultaneously at the proper rates. Care should be taken, however, that the reaction mass is slightly alkaline. Preferably, the mass should be agitated during mixing. A hydrated gelatinous precipitate of alumina is formed which is washed by decantation to free it of excess alkali and reaction salts, preferably with hot water at one of the named temperatures, as previously described in connection with the washing of silica hydrogel.

The washed gelatinous alumina precipitate is then treated in the same manner as described in connection with the treatment of silica hydrogel to convert it into a final product having a lower apparent density than the final product obtained from an alumina precipitate which has not been treated according to the process of the present invention except that a 50% solution of calcium chloride in place of 15% solution of said salt is employed.

If desired, the washed gelatinous alumina precipitate may be treated with a peptizing agent, preferably a acidic peptizing agent, as for example, a weak solution of acetic acid. This treatment is effected by rubbing and stirring into the alumina precipitate a dilute solution of acetic acid in the ratio of, for instance, 100 cc. of an 8% acetic acid solution for 500 grams of the gelatinous alumina precipitate. Preferably, the acetic acid and the precipitate are added to each other slowly with combined rubbing and stirring. The temperature at which this treatment is effected may vary from 20° to 95° C. Usually, digesting for a number of hours, say about 1 to 2 hours, is sufficient to peptize the precipitate. The peptized mass, after a time, stiffens to the consistency of lard.

The washed peptized alumina precipitate is then treated in the same manner as the silica hydrogel previously described to convert it into a final product having a lower apparent density than either the product obtained from a non-peptized or peptized alumina precipitate which has not been treated according to the present invention except that a 10% solution of calcium chloride in place of a 15% solution of said salt is used.

To make a dried ferric oxide gel according to the present invention, a hydrous ferric oxide gel is prepared as by forming a 6% solution of ferric chloride, and cooling same to a low temperature say about 0° C. or lower. A solution of alkali such as sodium hydroxide of like or higher strength is next prepared, and is also cooled to a low temperature, say about 0° C. or lower. The alkali solution is then added to the ferric chloride solution with agitation. The temperature during the mixing should be maintained preferably below 10° C. A gelatinous precipitate which is formed is filtered, or pressed, and then washed to free it of reaction salts, preferably with hot water at one of the named temperatures as previously described in connection with the washing of silica hydrogel.

The washed gelatinous ferric oxide precipitate is then treated in the same manner as described in connection with the silica hydrogel to convert it into a final product having a low apparent density except that a 50% solution of calcium chloride in place of a 15% solution of said salt is used.

For the making of a dried plural gel containing the oxides of tin and tungsten according to the present invention, a hydrous gel of tin and tungsten is prepared. This is done by forming a mixture of stannic salt solution and a tungstate solution as by mixing 55 cc. of an 8% sodium tungstate solution and 100 cc. of a 10% stannic chloride solution together. To this mixture is then added gradually 20 cc. of a 10% ammonium hydroxide solution with agitation. It is possible to add the ammonium hydroxide to the sodium tungstate solution, and then add such mixture to the stannic chloride solution with agitation, the resulting mixture in each case is slightly acid. The reaction mixture thus formed, after a time, sets to a hydrogel or jelly which is washed thoroughly with water to free it of reaction salts, preferably with hot water at one of the named temperatures as previously described in connection with the washing of the silica hydrogel.

The washed hydrous gel containing the oxides of tin and tungsten is then treated in the same manner as described in connection with the treatment of a silica hydrogel to convert it into a final product having a low apparent density.

To make a dried plural gel containing the oxides of silicon and tungsten according to the present invention, a hydrous gel containing both of said oxides is prepared. This may be effected by first preparing a hydrous tungsten oxide gel by gradually adding a solution of an acid, such as hydrochloric or sulphuric acid, to a solution of a sodium tungstate of 3 to 8% strength with stirring. The total amount of acid used is such as to give the final acidity of the reaction mass equal to about 0.1 N. to 0.5 N. acid. With this acidity the reaction mixture or sol will coagulate or set to a hydrogel in a few minutes, say 4 to 30 minutes at room temperature. The hydrogel formed is rather soft and must be washed carefully. It is broken into pieces and washed free of reaction salts, preferably with hot water at one of the named temperatures previously described in connection with the washing of silica hydrogel.

About 2 to 3% by weight of the hydrous gel of tungsten oxide is mixed with about 97 to 98% by weight of the washed silica hydrogel prepared in the manner previously described, or in any other well known way.

The hydrous gel containing the oxides of tungsten and silica is then treated in the same manner as described in connection with the treatment of silica hydrogel to convert it into a final product having a low apparent density.

The term "apparent density" as used herein, means the weight in grams of a cubic centimeter of gel consisting of particles of a predetermined size, in this instance 200 to 300 mesh particles. By this is meant, that all the particles will pass through a 200 mesh sieve but will be caught on a 300 mesh sieve.

Having thus described the invention, what is claimed as new and desired to be secured by Letters Patent is:

1. The process of making a hard porous gel of low apparent density, consisting in preparing an inorganic hydrous oxide gel of the type described, washing said gel with heated water, impregnating it with a salt soluble in a leaching liquid chemically inert with respect to the gel, drying said impregnated hydrous gel, and leaching out the salt.

2. The process of making a hard porous gel of low apparent density, consisting in preparing an inorganic washed hydrous oxide gel of the type described, impregnating it with a salt of an alkali forming metal soluble in a leaching liquid chemically inert with respect to the gel, drying said impregnated hydrous gel, and leaching out the metal salt.

3. The process of making a hard porous gel of low apparent density, consisting in preparing an inorganic washed hydrous oxide gel of the type described, impregnating it with a water soluble salt of an alkaline earth metal, drying said impregnated hydrous gel, and leaching out the salt.

4. The process of making a hard porous gel of low apparent density, consisting in preparing an inorganic washed hydrous oxide gel of the type described, impregnating it with calcium chloride, drying said impregnated hydrous gel, and leaching out the calcium chloride.

5. The process of making a hard porous gel of low apparent density, consisting in preparing a washed hydrous silica gel, impregnating it with a calcium chloride, drying said impregnated hydrous gel, and leaching out the calcium chloride.

6. The process of making a hard porous gel of low apparent density, consisting in preparing a washed hydrous alumina gel, impregnating it with a calcium chloride, drying said impregnated hydrous gel, and leaching out the calcium chloride.

7. The process of making a hard porous gel of low apparent density, consisting in preparing a washed hydrous alumina gel obtained from a peptized alumina precipitate, impregnating it with a calcium chloride, drying said impregnated hydrous gel, and leaching out the calcium chloride.

8. The process of making a hard porous gel of low apparent density, consisting in preparing a silica hydrogel, washing it with water at a temperature of 105° to 175° F. to remove soluble matter therefrom, allowing the washed hydrogel to stand in a solution of calcium chloride to impregnate it therewith, draining off the liquid after impregnation, drying the hydrogel, and leaching out the calcium chloride.

9. The process of making a hard porous gel of a prescribed apparent density, consisting in preparing an inorganic hydrous oxide gel of the type described, washing the gel with heated water, impregnating it with a salt soluble in a leaching liquid chemically inert with respect to the gel the quantity varying inversely with the apparent density desired, drying the impregnated hydrous gel, and leaching out the salt.

10. The process according to claim 9 wherein the impregnating substance is a salt of an alkali.

11. The process according to claim 9 wherein the impregnating substance is calcium chloride.

GERALD C. CONNOLLY.